(12) United States Patent
DiPlacido et al.

(10) Patent No.: US 7,603,425 B2
(45) Date of Patent: Oct. 13, 2009

(54) EMAIL PROVIDER PREVENTION/DETERRENCE OF UNSOLICITED MESSAGES

(75) Inventors: Marco DiPlacido, Seattle, WA (US); Mehul Shah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 11/500,200

(22) Filed: Aug. 7, 2006

(65) Prior Publication Data

US 2008/0034046 A1 Feb. 7, 2008

(51) Int. Cl.
G06F 15/16 (2006.01)
G06F 15/173 (2006.01)
G06F 7/04 (2006.01)

(52) U.S. Cl. .................. 709/206; 709/224; 709/225; 726/26

(58) Field of Classification Search .................. None
See application file for complete search history.

(56) References Cited

U.S. PATENT DOCUMENTS

| 6,052,709 | A | 4/2000 | Paul ........................ 709/202 |
| 7,487,213 | B2* | 2/2009 | Zager et al. ............... 709/206 |
| 2003/0167311 | A1* | 9/2003 | Kirsch ....................... 709/206 |
| 2003/0187942 | A1 | 10/2003 | Quine et al. ............... 709/207 |
| 2003/0225841 | A1* | 12/2003 | Song et al. ................. 709/206 |
| 2005/0114452 | A1* | 5/2005 | Prakash ..................... 709/206 |
| 2005/0188042 | A1 | 8/2005 | Kagawa ..................... 709/206 |
| 2005/0204133 | A1 | 9/2005 | LaLonde ................... 713/168 |
| 2006/0075030 | A1* | 4/2006 | van Riel ..................... 709/206 |
| 2006/0075048 | A1 | 4/2006 | Gruper et al. ............... 709/206 |
| 2007/0106734 | A1* | 5/2007 | Mahajan et al. ............ 709/206 |
| 2007/0174398 | A1* | 7/2007 | Addante ..................... 709/206 |

FOREIGN PATENT DOCUMENTS

| WO | 2005001733 | 1/2005 |
| WO | 2005013030 | 2/2005 |
| WO | 2006006790 | 1/2006 |

OTHER PUBLICATIONS

Kaushik et al., S.; "Email Feedback: A Policy-based Approach to Overcome False Positives," FMSE 05, pp. 73-82, Nov. 2005.
Hoffman & Crocker, P. & D.; "Unsolicited Bulk Email: Mechanisms for Control," Internet Mail Consortium Report, May 4, 1998, pp. 1-19.
"Spam Control," Approved by the IEEE-USA Board of Directors, No. 2003, pp. 1-5.
Clayton, R.; "Stopping Spam by Extrusion Detection," U of Cambridge, 8 pgs., 2004.

* cited by examiner

*Primary Examiner*—Wen-Tai Lin
(74) *Attorney, Agent, or Firm*—Westman, Champlin & Kelly, P.A.

(57) ABSTRACT

An email sending service embeds identifying information within emails sent on behalf of its service consumers. A recipient notifies their email provider that an email received from the service is a spam email (e.g., an unsolicited message). The email provider forwards a complaint, including a copy of the email, to the email sending service. The service utilizes the information embedded in the email to identify the responsible service consumer. The email sending service then takes corrective action as necessary to prevent or deter the identified service consumer from sending subsequent spam emails.

15 Claims, 6 Drawing Sheets

EMAIL PROVIDER PREVENTION/DETERRENCE OF UNSOLICITED MESSAGES

BACKGROUND

Certain entities, including both businesses and consumers, sometimes have a need to send bulk email. Bulk email is email that is sent to a large number of recipients. The number of recipients can run into the hundreds, the thousands, or even more. For example, an organization may need to send email to its employees. Or, a company may need to send email containing information about new products or discounts to consumers who have indicated that they want to receive such information. Or, a university may need to send email to all or some of its students. These are just examples of scenarios in which bulk email might be desirable.

Sending bulk email can be a relatively simple undertaking. This is especially true when the same email content is to be sent to all recipients. The email protocol SMTP used for sending email over the Internet supports specifying multiple recipients for a single message.

However, sometimes it is desirable for email content to vary at least slightly from one recipient to the next. For example, when a company sends information about a discount to its customers who wish to be notified of such a discount, the company may want to include the name and address of each customer in the email content. Or, when an organization sends email to its employees, it may want to include, in the email content, a unique URL link for each employee such that each employee can, for example, click on the link and at least semi-automatically register for a training program.

Bulk email sending services have been created to support special needs such as, but certainly not limited to, the described need to send numerous email messages that each incorporate some element of recipient-specific content. Even when all recipients are to receive the same email content, a bulk email sending service can often provide certain specialized services. Such services might include informational services such as the ability to track responses to each email, to track when and/or if email has been opened, etc.

One problem faced by bulk email sending services is the exploitation of their services by customers to send unsolicited messages, sometimes referred to in the art as "spam email" or just "spam." A bulk email sending service is lured into sending spam when it sends email, on behalf of its customer, to a recipient that did not choose to receive the message. Bulk email sending services typically provide terms of use that state that the service cannot be used for sending unsolicited messages. Unfortunately, however, these terms are sometimes abused and it is difficult (e.g., expensive) for a sending service to track such abuse and/or to legally pursue the perpetrators.

On the recipient side, email service providers often provide their customers with one or more tools to combat against the receipt of spam. These tools sometimes allow a user to block subsequent email from a sender of spam. In some cases, when an email recipient utilizes a spam tool to block a particular sender, the email service provider will automatically delete (or send to a special folder) all subsequent emails received from the mail servers that sent the email. In some cases, email service providers actively monitor spam emails and, if they find a large number originating from the mail servers of a bulk email sending service, they may choose to block all subsequent emails from those mail servers so as to reduce the load on their resources.

Bulk email sending services commonly will send the bulk email from their own servers. Thus, an over-inclusive response to spam by an Internet service provider can dramatically reduce the effectiveness of the email sending service for all of its customers, including well-meaning customers that do not send spam. In other words, legitimate (non-spam) emails sent out using the bulk email sending service can get automatically deleted or mishandled because of prior spam emails sent out by other customers of the service. Even if a few customers of the bulk email sending service send out spam email to several recipients, this can affect the quality of service for all customers of the service.

In many cases, bulk email sending services include an unsubscribe link (e.g., a URL link) in the content of emails sent to recipients on behalf of the customer. Accordingly, if the recipient finds the email to be spam, the recipient can click on the link to inform the sender that the email is spam. In response, the bulk email sending service can take measures to subsequently ensure that emails from that sender will not get sent to the recipient.

Unfortunately, few recipients of spam actually do click on the unsubscribe link. This may be because some spam email senders abuse the unsubscribe link mechanism. For example, a spammer may send out hundreds of emails to recipient email addresses not knowing the identity of the recipient or whether the recipient email address is a valid address. If a recipient clicks on the unsubscribe link, the spammer then knows that the recipient email address is a valid recipient email address to which more spam emails can be sent successfully. To avoid falling prey to such abuse, many email recipients simply ignore the unsubscribe link. Some service providers even advise their customers not to click on such links.

The discussion above is merely provided for general background information and is not intended for use as an aid in determining the scope of the claimed subject matter.

SUMMARY

Systems and methods are provided to enable an email sending service to prevent and/or deter its service consumers from utilizing the service to send unsolicited messages. In one embodiment, the service embeds identifying information within emails sent on behalf of its service consumers. A recipient notifies their email provider that an email received from the service is a spam email (e.g., an unsolicited message). The email provider forwards a complaint, including a copy of the email, to the email sending service. The service utilizes the information embedded in the email to identify the responsible service consumer. The email sending service then takes corrective action as necessary to prevent or deter the identified service consumer from sending subsequent spam emails.

This Summary is provided to introduce, in a simplified form, a selection of concepts that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Figure 1:
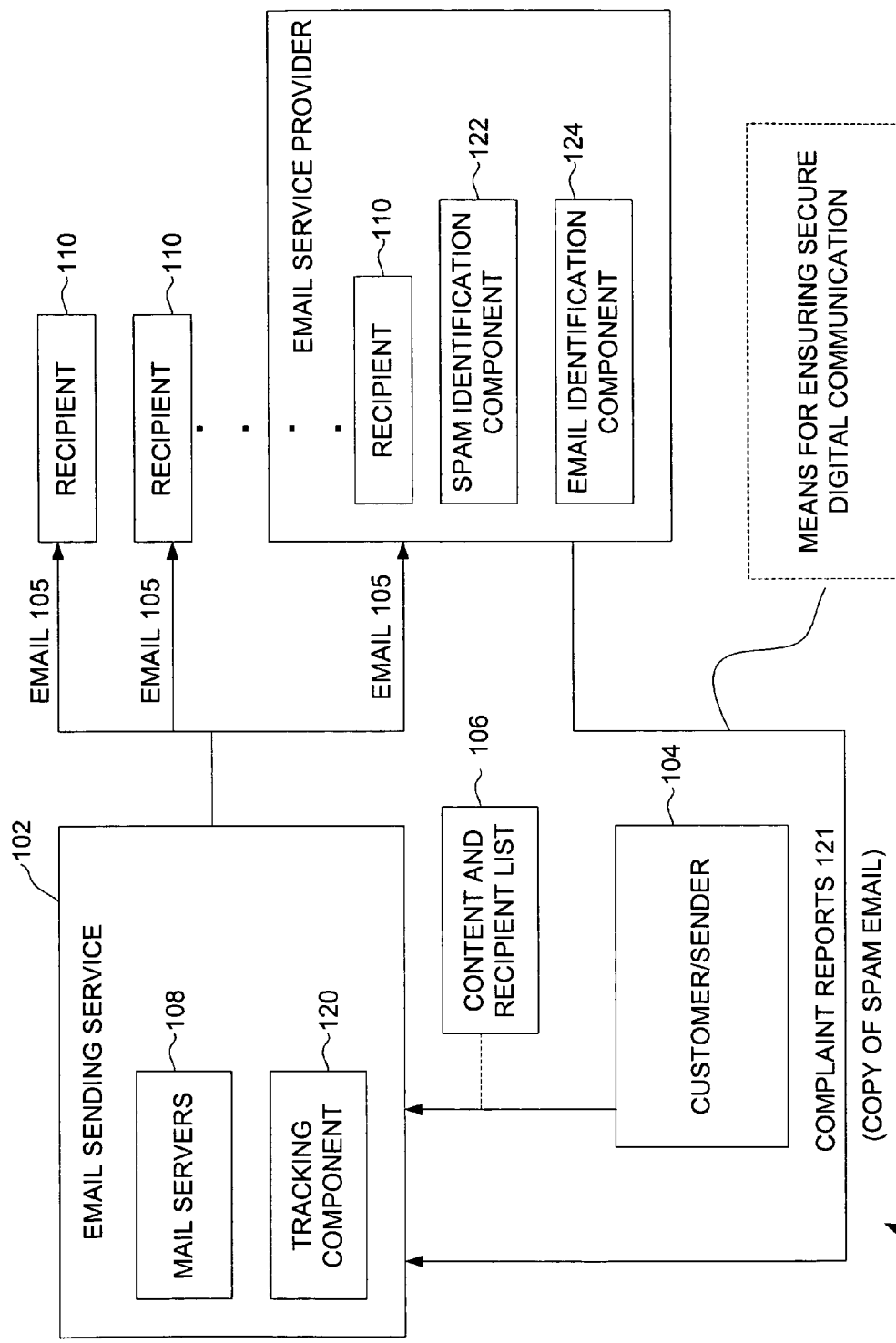
FIG. 1 is a schematic diagram of a bulk email system.

FIG. 1 is a schematic diagram of a bulk email system 100. A bulk email sending service 102 receives, from a customer 104, email content and a list of recipients 110. The content and list are collectively shown in FIG. 1 as item 106. The bulk email sending service 102 then sends emails 105, on behalf of customer 104, from server(s) 108 to the recipients 110. Only three recipients are shown in FIG. 1 for the purpose of simplification.

Within system 100, in general, the entity that is in the best position to determine whether an email 105 is spam is the recipient 110 that receives the message. Thus, it is desirable for recipients 110 to be provided with a means for indicating that a received email is spam. As will be described in detail below, the means for indicating can be a feature offered by an email service provider. Regardless of how the indication function is implemented, it is desirable for service 102 to be equipped to actively respond to indications in a manner that will reduce or eliminate subsequent transmissions of spam from mail servers 108. For example, service 102 might respond by preventing a recipient from receiving subsequent emails from the same sender 104.

Email sending service 102 illustratively includes a tracking component 120. Component 120 is configured to enable service 102 to uniquely track each email 105. For example, component 120 illustratively tracks, for each email sent from server 108, the customer on whose behalf the email was sent, the recipient of the email the date/time the email was sent, and/or any other identifying component. In one embodiment, identifiers are incorporated into the header information of each email sent from servers 108. The identifiers are indicative of unique information tracked by component 120 on an email-by-email basis.

As is known in the art, each recipient 110 receives email through an email interface provided by an email service provider. Within FIG. 1, for the purpose of simplification, a single email service provider 116 is shown in conjunction with a single recipient 110. It is to be understood that other recipients 110 are also affiliated with the same or a different email service provider. Any service provider within system 100 can be configured in a manner that is similar to the exemplary provider 116 described herein.

Email service provider 116 includes a spam identification component 122. Identification component 122 enables a recipient 110 to identify a received email 105 as spam. In one embodiment, the identification means provided to the recipient does not require the recipient to click an unsubscribe link provided in the spam email 105 (e.g., a link that enables the recipient to unsubscribe from receiving future emails from the sender). In one embodiment, email service provider 116 instead provides a "mark as spam" function (e.g., a button, a check box, etc.) that is integrated into the email interface. Through the "mark as spam" function, a recipient can communicate to email service provider 116 that a particular email 105 is spam. This communication does not require navigating a link embedded in the email itself.

Email service provider 116 also includes an email source tracking component 124. When recipient 110 indicates to provider 116 that a particular email 105 is spam, component 124 enables the provider to track whether the mail server that sent out the email is a known bulk email providing source. In one embodiment, the tracking function is based on the IP address of the mail server used to send out the email, though other means or tracking should be considered within the scope of the present invention. In one embodiment, when it is determined positively that the source of the spam email is indeed a bulk email sending service, then the email is forwarded to a contact email address for the bulk email providing service (e.g., provided via a registration process wherein bulk email sending services register with email service providers). The spam email is illustratively marked as "complaint." Reports of spam emails are illustratively shown in FIG. 1 as complaint reports 121.

When bulk email sending service 102 receives a complaint report 121, tracking component 120 analyzes the included corresponding email in order to identify the customer 104 who requested that the email be sent to the recipient. In one embodiment, the email sending service 102 records this information and, if the customer 104 attempts to send subsequent emails to the same recipient via the sending service, then the service blocks (i.e., does not send) those emails.

In one embodiment, bulk email sending service 102 responds to spam reports 121 through action other than blocking subsequent mails. For example, service 102 can send out a warning to a customer 104, temporarily suspend the customer's account, and/or take other action as is deemed appropriate. The action is taken can be made dependent upon the number of complaint receives in total, in response to a particular email campaign, from a single recipient, etc. Further, action could be based on a calculation that is more complex than a simple counting of complaint reports. For example, action could be taken when the ratio of the number of unique recipients who complain with respect to a total number of recipients the email was sent out to surpasses a predetermined threshold. Those skilled in the art will appreciate many other similar enforcement schemes could be implemented. Those noted herein are only example of what is to be considered within the scope of the present invention.

As should now be apparent, system 100 enables a recipient to report spam emails to an entity that they trust, namely, their email service provider. Further, the email service provider forwards the spam email in the form of a complaint to an entity that they trust, namely, the bulk email sending service.

In one embodiment, as is indicated by block 130, the transactions between the email service provider and the bulk email sending service are secured in order to ensure trustworthy communication. For example, the communication path, whether it is email-based or otherwise, can illustratively be secured through implementation of means such as, but not limited to, a digital signature scheme that enables a verification of the source of communication. Communication between a recipient and their email service provider can be similarly secured to ensure trustworthy communications.

Figure 2:
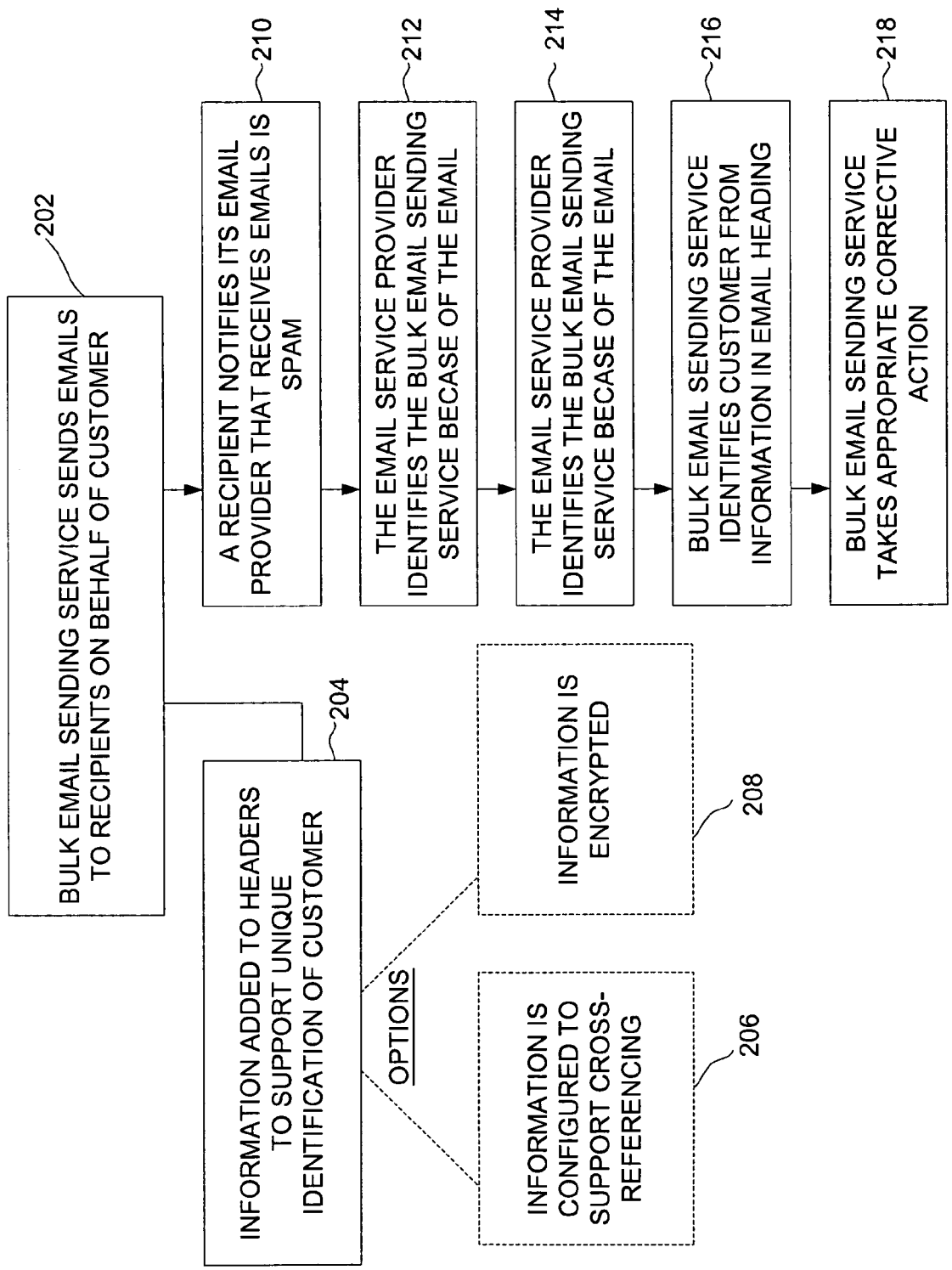
FIG. 2 is a block flow diagram demonstrating a flow of interactions and functions that occur within a bulk email system.

FIG. 2 a block diagram demonstrating the flow of interactions and functions that occur within bulk email system 100. In accordance with block 202, bulk email sending service 102 sends an email 105 on behalf of customer 104. Consistent with block 204, information is added to email 105 in order to uniquely identify the customer, the recipient, the email content, the date-time the email was sent and/or any other identifying information.

In accordance with block 206 (shown in the Fig. as an optional implementation, rather than embedding the actual identifying information within email 105, it is also within the scope of the present invention to embed an identifier that can be cross-referenced against a database containing the actual identifying information. For example, in one embodiment, tracking component 120 is configured to generate, and embed within email 105, a unique GUID that can be cross referenced against a database that contains corresponding identifying information (e.g., the recipient, the customer, the email content, the data-time the email was sent, etc.). Those skilled in the art will appreciate that a GUID is but one of many examples of identifiers that can be utilized to uniquely identify an email for purposes such as those described herein. Other mechanisms can be utilized without diverging from the scope of the present invention. For example, the embedded identifier could just as easily be any number that enables emails to be distinguishable from one another.

In one embodiment, security techniques can be applied such that the embedded identifier or actual embedded identifying information can be interpreted only by bulk email sending service 102. Those skilled in the art will appreciate that there are many ways to accomplish this security goal. In one example, the embedded identifier or actual identifying information could be encrypted such that it can only be decrypted by bulk email sending service 102. The option of encrypting is shown in FIG. 2 as block 208, which is an optional implementation.

In accordance with block 210, a recipient 110 notifies its email service provider 116 that a received email 105 is spam. The recipient illustratively accomplishes this notification by means of an easy-to-use mechanism provided by the email service provider. For example, in one embodiment, the recipient clocks a "mark as spam" button when viewing the spam email.

The spam notification, whatever form it is in, illustratively goes back to the email service provider. The service provider illustratively has access to the email contents and is able to read the headers in order to identify the IP address of the bulk email servers that sent out the email. The service provider illustratively maintains a list of all bulk email sending services who participate in the "spam-check" system described herein. The list illustratively includes, for a given bulk email sending service, the IP address of their email sending servers as well as contact details (e.g., an email address) that outline where "complaints" about emails can be sent. Thus, in accordance with block 212, using information in the email header, the email service provider identifies the bulk email sending service associated with the IP address from which the email was sent.

In accordance with block 214, email service provider 116 forwards a spam complaint to the responsible bulk email sending service. The spam complaint includes (or entirely consists of) a copy of the relevant email. The spam complaint can be as simple as a copy of the email tagged as a complaint. In one embodiment, the spam complaint is sent to an email address registered to the responsible bulk email sending service.

Thus, in this manner, bulk email sending service 102 collects complaint emails from email service providers of recipients. In accordance with block 216, using the uniquely identifiable information included in the email headers, service 102 can identify the responsible customer 104, the recipient, the data-time the emails was sent out, etc. With this type of information, in accordance with block 218, service 102 can take corrective action based on the complaint.

Figure 3:
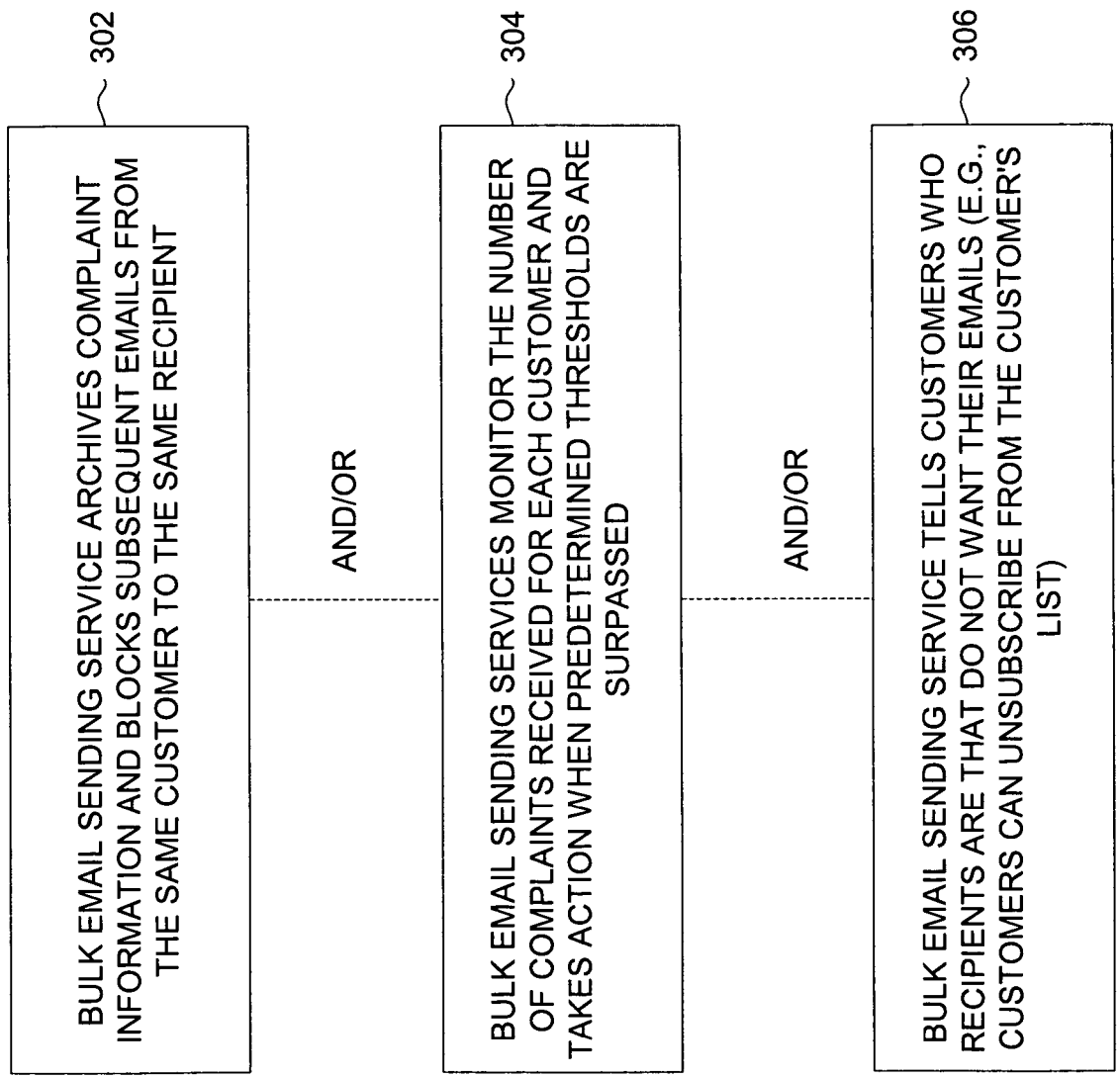
FIG. 3 is a schematic block diagram demonstrating corrective actions taken by a bulk email sending service to deter or prevent the sending of spam emails.

The most appropriate nature and type of corrective action will depend at least upon the business procedures and values of a given sending service. FIG. 3 is a schematic block diagram demonstrating the kinds of action that could be taken. The list of options shown in FIG. 3 is certainly not complete or comprehensive. Further, more than one option could be chosen in combination without departing from the scope of the present invention.

As is demonstrated by block 302 in FIG. 3, one option is for bulk email sending service 102 to archive the complaint information and block subsequent emails from the same customer to the same recipient. In accordance with block 304, another option is for service 102 to monitor the number of complaints received for each customer and, if a threshold is surpassed, warnings could be sent to the customer, the customer could be suspended, etc. The threshold could be an absolute value (e.g., 50 complaints), an absolute value over time (e.g., more than 50 complaints in 30 days) or a relative value (e.g., more than 10% of emails sent out generate complaints), etc. In accordance with block 306, yet another option is for service 102 to send customer 104 the identity of recipients who do not wish to receive the customer's emails. However, it may not be desirable to reveal to the customer the identity of a recipient that marked an email as spam.

Those skilled in the art will appreciate that the present invention could just as easily be implemented for a purpose other than defending against spam or other forms of unsolicited email. In one embodiment, a user identifies can identify an email as "subscription no longer wanted" rather than as "spam." In response, the email service provider identifies the responsible bulk provider and sends the email with an indication that the recipient wants to unsubscribe from the list and/or from further emails from the same sender. The recipient is then removed accordingly either by the sending service (subsequent messages blocked) or by the customer (user information and indication that user wants to unsubscribe is sent to the customer). Thus, the same system can be implemented as a means for a user to unsubscribe to a period email that is was but is no longer desired.

In accordance with other aspect of the present invention, "opt-in" measures can be implemented so as to enable recipients to choose to receive emails from certain senders.

In one opt-in embodiment, a recipient can choose to opt-in to receive communications sent on behalf of a customer from a bulk email sending service. In other words, the recipient agrees to receive mail from a particular customer of the email sending service.

Figure 4:
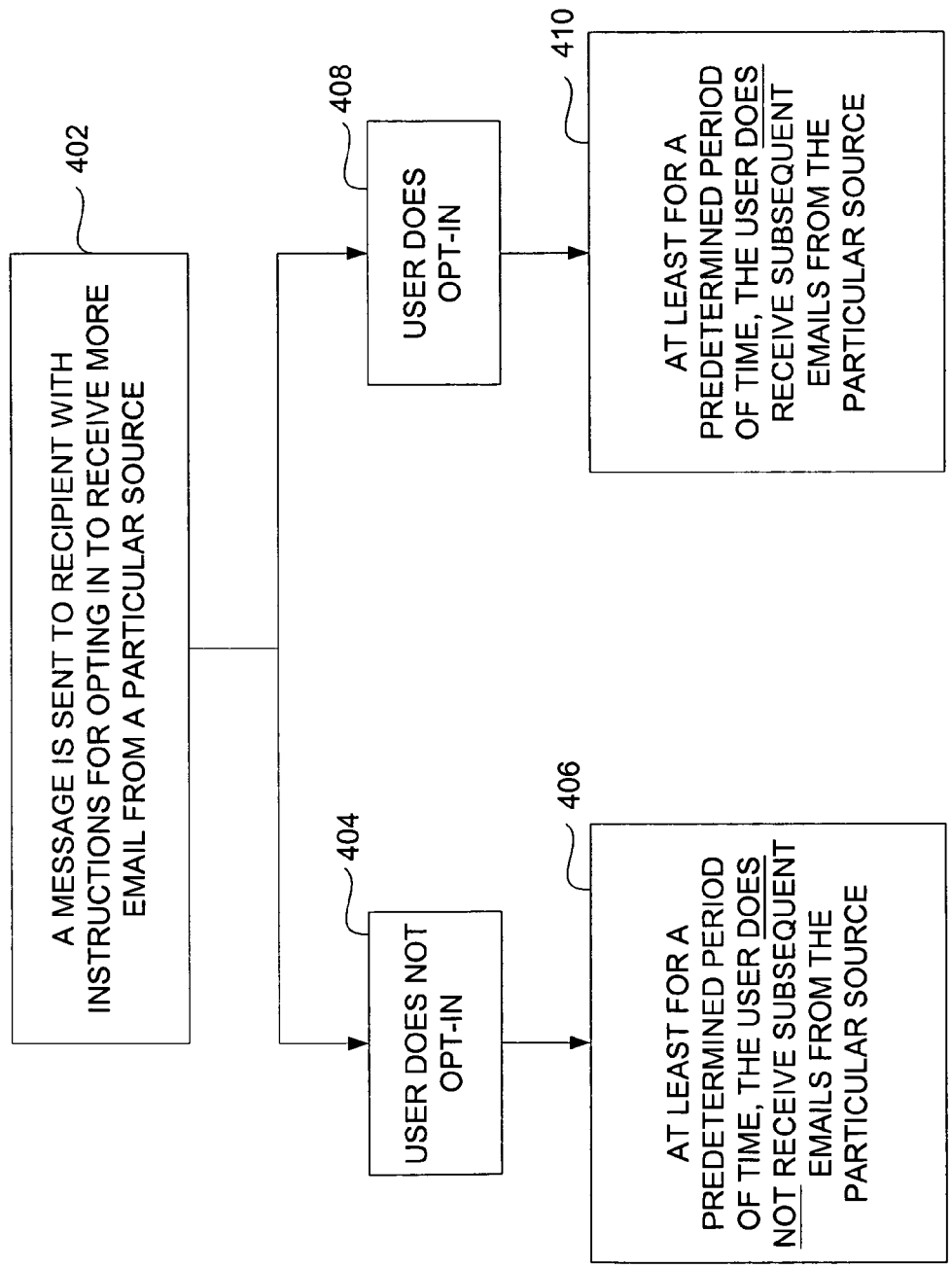
FIG. 4 is a block flow diagram demonstrating steps associated with an opt-in procedure involving email technology.

FIG. 4 is a block flow diagram demonstrating steps associated with an opt-in embodiment in the context of a bulk email sending service. In accordance with block 402, a message is sent to a recipient with instructions for opting in to receive more email from a particular source. For example, a customer might engage a bulk email sending service to send a first email to an identified plurality of recipients. The sending service illustratively appends message content to the emails destined for the identified recipients. The nature of the appended content will vary but might say something like "Please reply to this message or clock the following link to receive future messages from customer X . . . otherwise you will not receive communications from this bulk email sending service on behalf of customer X for the next N days." Of course, a termination of subsequent emails from customer X does not necessarily have to be limited in duration. It could just as easily be permanent, or at least permanent unless the recipient indicates a desire for it to be otherwise.

A GUID, an encrypted unique value or some other identifier is illustratively embedded in the reply message or link to uniquely identify the relevant recipient and/or customer. In accordance with boxes 408 and 410, if the bulk email sending service receives the opt-in message, the recipient will be flagged accordingly, and the bulk mailing service will support subsequent communications from the relevant customer to the relevant recipient. In accordance with blocks 404 and 406, if the recipient does not reply to the message, then subsequent attempts by the relevant customer to utilize the sending service to send email to the relevant recipient will fail. In one embodiment, once N days have passed, then the customer can send another message to the recipient. An indication by a recipient to receive emails from a particular customer could just as easily be configured to expire after a predefined period of time. In one embodiment, when the user communicates permission to receive subsequent emails, the user indicates whether and when that permission should expire. The sending service acts accordingly, and following an expiration, might send another email with opportunity to again give permission for subsequent emails from the customer.

Accordingly, in one embodiment, a bulk emailing system is configured to require a recipient to explicitly declare their intention and desire to receive communications from a given customer. One way to facilitate the explicit declaration is via a message reply or a clinking of a link. Those skilled in the art will appreciate that these are just examples and that other means are to be considered within the scope of the present invention.

Those skilled in the art will appreciate that the present invention is not limited to scenarios that involve bulk email sending services. Any email service can be substituted into the same or similar systems without departing from the scope of the present invention. The concept of a bulk email sending service is provided solely for the purpose of providing one example of an applicable scenario. Further, the present invention is not necessarily limited to an email sending service.

In one embodiment, the methods described herein for reducing or eliminating spam can be extended beyond emailing services. For example, similar methods can be applied to RSS (Really Simple Syndication) processing. RSS is a way for entities to communicate updates or announcements to partners or customers via a computer network (e.g., the Internet) using standard protocols (e.g., HTTP, XML, etc.).

Figure 5:
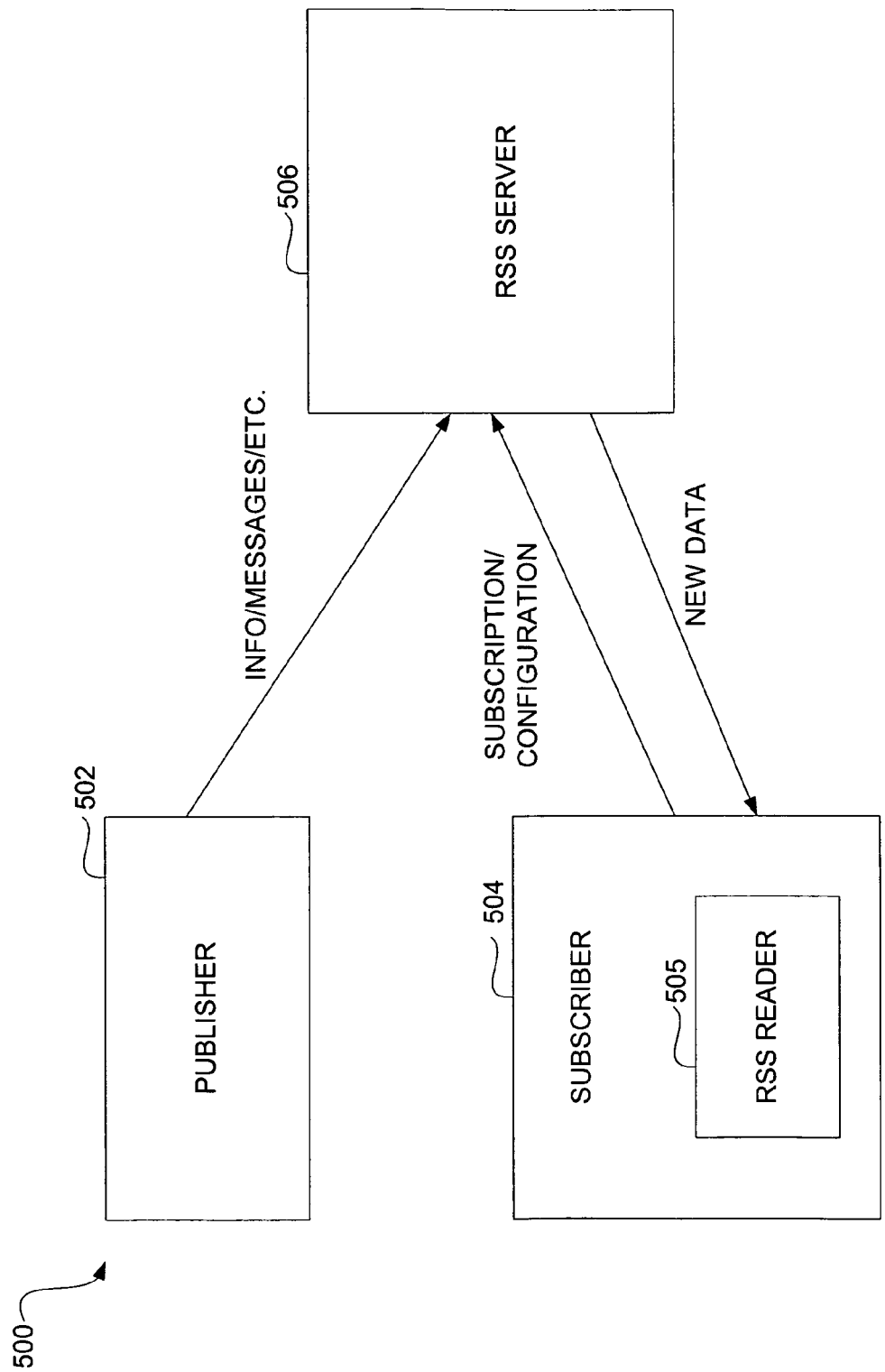
FIG. 5 is a schematic diagram of an example of an RSS system.

FIG. 5 is a schematic diagram of an example of one implementation of an RSS system 500. System 500 includes a publisher 502, a subscriber 504 and an RSS server 506. Publisher 502 publishes information or messages to server 506. Subscriber 504 subscribes to an RSS feed (or channel or URL, etc.) that is published on RSS server 506. Subscriber 504 configures the channel (or URL) in an RSS reader application 505. Once configured, the RSS reader application 505 periodically polls the RSS server 506 for new announcements or other information on the channel. If there are new announcements, the RSS reader 505 retrieves those announcements/messages and, optionally, the content of those announcements/messages. In this manner, any new messages or announcements that are published by the publisher 502 via the RSS system are retrieved by the subscriber 504.

An RSS system is similar to an email system in that the technology enables an entity to communicate announcements or messages (as well as corresponding content) to a plurality of recipients. However, an RSS system is less prone to the sending of data on an unsolicited basis. This is at least because, with RSS systems, the publisher of the content does not send data in the form of mail to recipients. Instead, the recipient establishes a relationship and then voluntarily pulls down information published by the sender on a server.

Figure 6:
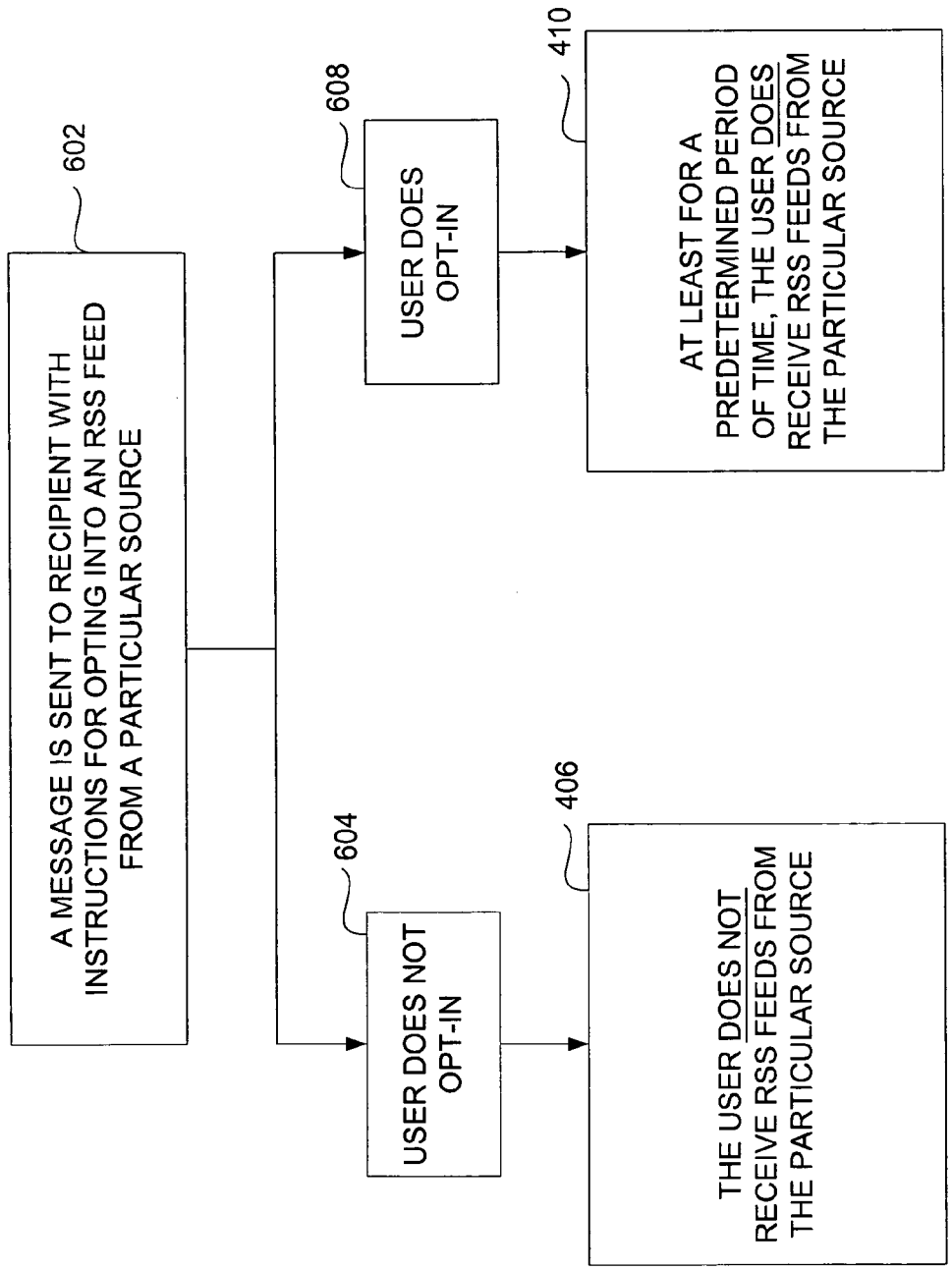
FIG. 6 is a block flow diagram demonstrating steps associated with an opt-in procedure involving RSS techniques.

FIG. 6 is a block flow diagram demonstrating how, in one embodiment, an email sending service (including but not limited to a bulk email sending service) can implement RSS techniques to enable their customers to communicate information and messages to recipients. In accordance with block 402, a message is sent to a recipient with instruction for opting into an RSS feed from a particular source. For example, the first time a customer utilizes a sending service to send email to a given recipient, the email sending service places an RSS URL in the email message, along with related instructions for the user. The instructions might say something like "in order to receive future communications from customer X, click here to subscribe to an RSS feed for customer X."

In accordance with boxes 604 and 606, if the recipient does not comply with the provided instructions, then he or she will not receive corresponding RSS feeds from the particular source. However, in accordance with boxes 608 and 610, if the recipient does comply with the instructions (e.g., by clicking the link) then there is an automatic configuration of the recipient's RSS reader so as to subscribe to the relevant RSS feed(s). In one embodiment, the feed URL in the email contains unique identifiers that identify the customer and/or subscriber. These identifiers can be leveraged by the sending service for subsequent message processing, such in a scenario wherein the sending service handles RSS message processing.

Accordingly, in one embodiment, the RSS process (e.g., the RSS URL) is hosted by the email sending service. In this case, the sending service essentially acts as the RSS server. Whenever the customer desires to send additional messages, the email sending service hosts message content on web servers (e.g., in the form of HTML web pages). The email sending service updates the customer's RSS feed as the customer desires. The subscriber gets new messages, announcements, content, etc. by way of the RSS reader.

All parties involved benefit from the implementation of RSS techniques as described. Customers get guaranteed delivery; no longer do they have to worry about getting placed in junk mail folders of intended recipients. Recipients get announcements as they occur without having to sift through their inbox (although in some systems RSS feeds can sometimes be delivered to an email inbox if the user desires this to happen). The email sending service gains the comfort of knowing that fewer and fewer unsolicited emails will be sent from their servers, thus enhancing quality of service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for supporting the prevention or deterrence of the utilization of an email sending service to send, to a recipient, an email that the recipient does not wish to receive, the system comprising:

an email sending service that, on behalf of a service consumer, utilizes a computer processor that is a functional component of a computing device to send a separate email to each of a plurality of recipients, wherein each of the separate emails contains an identical collection of content selected by themselves consumer for mass distribution to the plurality of recipients, wherein the email sending service adds an item of content to a message body of each of the separate emails, the item of content in each of the separate emails being recipient-specific in that it is selected so as to be customized for the one of the plurality of recipients to which it is sent by the email sending service, wherein the email sending service adds to each separate email an encrypted representation of the service consumer's identity, wherein the encrypted representation is encrypted in that it is an identifier that uniquely identifies the service consumer such that the identifier is not directly indicative of the identity of the service consumer but can be utilized to derive the identity of the service consumer, wherein the recipient's email service provider integrates, into an interface of each of the separate emails, a mark-as-spam component in the form of a control that when activated by the recipient of the email identifies the email as spam, wherein when the email is identified as spam, the email service provider forwards the encrypted representation to the email sending service for identifying the service consumer, thereby enabling prevention of subsequent emails from the identified service consumer to the recipient, and wherein said control is of a nature that makes it such that said activation by the recipient does not require navigation of a hyperlink.

2. The system of claim 1, wherein the encrypted representation is an encoded representation of the service consumer's identity.

3. The system of claim 1, wherein the email sending service applies a key to the identifier so as to determine the service consumer's identity.

4. The system of claim 3, wherein applying the key to the identifier comprises cross referencing the identifier within a collection of cross referencing data maintained by the email service provider, wherein the collection of cross referencing data correlates the identify of the service consumer to the identifier.

5. The system of claim 3, wherein applying the key to the identifier comprises applying a decryption key to the identifier so as to decipher the service consumer's identity.

6. The system of claim 1, wherein the recipient-specific item of content in each of the separate emails is a postal mailing address of the recipient to which it is sent by the email sending service.

7. The system of claim 1, the recipient-specific item of content in each of the separate emails is a unique uniform resource locator containing identifying information specifically indicative of the recipient to which it is sent by the email sending service.

8. The system of claim 1, wherein the email sending service identifies the service consumer by cross-referencing said identifier that uniquely identifies the service consumer.

9. The system of claim 1, wherein the email sending service adds said identifier to each of the separate emails before they are sent to the plurality of recipients.

10. The system of claim 1, wherein said control is of a nature that makes it such that said activation by the recipient does not require activating an unsubscribe link.

11. The system of claim 1, wherein said control is a check box control.

12. A computer-implemented method for supporting the prevention or deterrence of the utilization of an bulk email sending service to send, to a recipient, an email that the recipient does not wish to receive, the method comprising:

utilizing a computer processor that is a functional component of a computing device to attach identifying information to an email;

sending the email, with the identifying information to a recipient; and receiving a copy of the email, wherein the identifying information is encrypted to uniquely identify the customer of the bulk email sending service, wherein said steps of utilizing, sending, and receiving are all steps performed by an email sending service, wherein the email contains a collection of content selected by a service consumer on whose behalf the bulk email sending service sends the email to the recipient, wherein the bulk email sending service utilizes the computer processor to add an item of content to the email, the item of content being recipient-specific in that it is selected so as to be customized for the recipient, wherein the recipient's email service provider integrates into an interface of each of the separate emails, a mark-as-spam component in the form of a control that when activated by the recipient of the email identifies the email as spam, wherein when the email is identified as spam, the email service provider forwards the encrypted representation to the bulk email sending service for identifying the service consumer, thereby enabling prevention of subsequent emails from the identified service consumer to the recipient, and wherein said control is of a nature that makes it such that said activation by the recipient does not require navigation of a hyperlink.

13. The method of claim 12, wherein attaching comprises attaching a cross-referencing mechanism.

14. The method of claim 12, wherein receiving comprises receipt by the bulk email sending service from the email service provider that provides email service to the recipient.

15. The method of claim 12, wherein receiving comprises receipt by the bulk email sending service as a report received from the email service provider that provides email service to the recipient.

* * * * *